April 20, 1954 W. W. WOLFE 2,676,002
MIXING AND FEEDING MECHANISM
Filed Sept. 15, 1951 3 Sheets-Sheet 1

INVENTOR.
WALTER W. WOLFE
BY
Carlsen + Hagle
ATTORNEYS

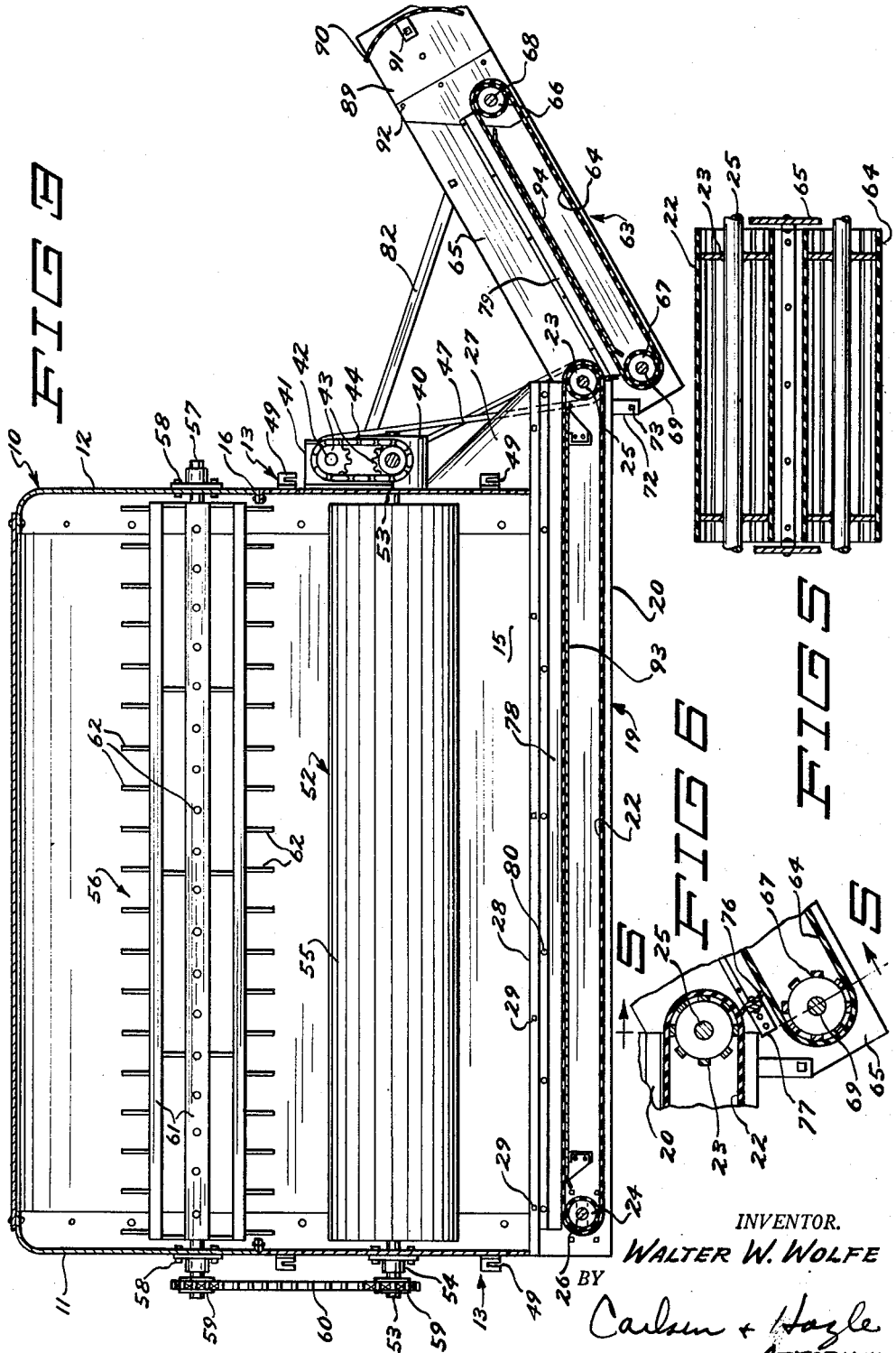

April 20, 1954
W. W. WOLFE
2,676,002
MIXING AND FEEDING MECHANISM
Filed Sept. 15, 1951
3 Sheets-Sheet 3
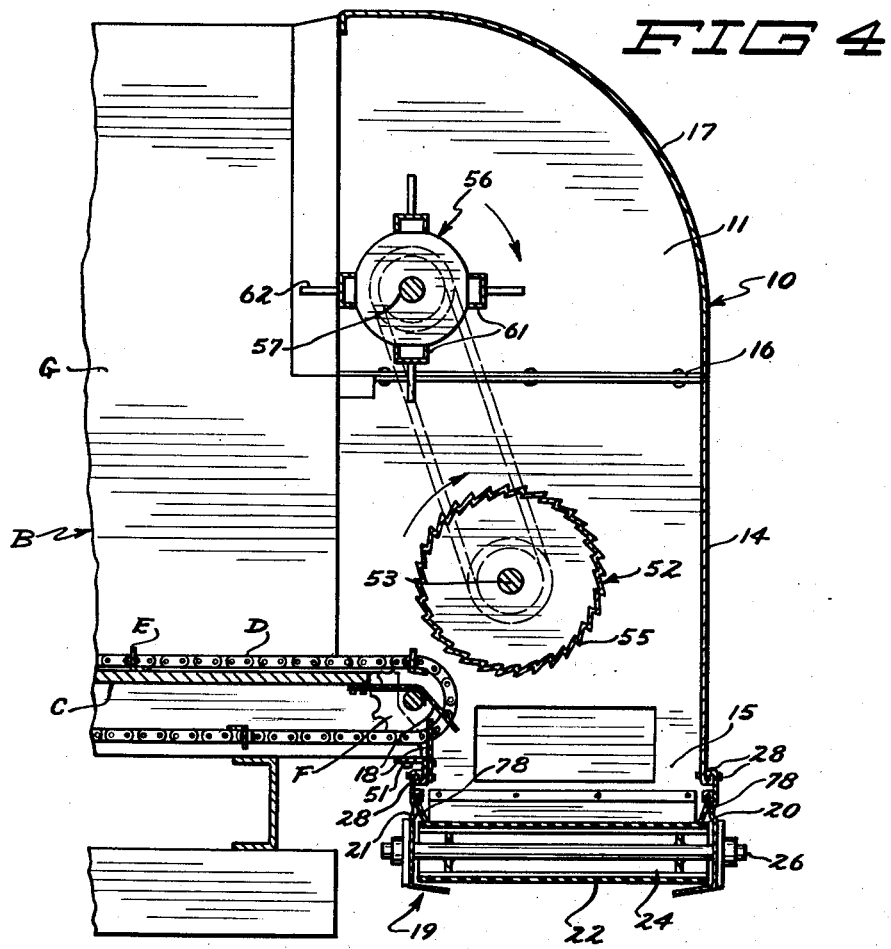
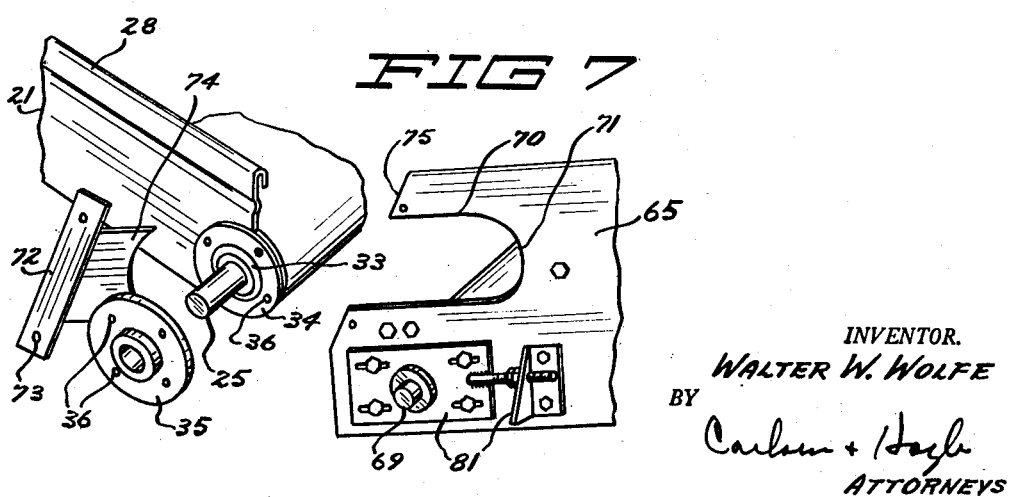
INVENTOR.
WALTER W. WOLFE
BY
ATTORNEYS Patented Apr. 20, 1954

2,676,002

UNITED STATES PATENT OFFICE 2,676,002

MIXING AND FEEDING MECHANISM

Walter W. Wolfe, Mound, Minn., assignor to Superior Separator Company, Hopkins, Minn., a corporation of Delaware Application September 15, 1951, Serial No. 246,859

7 Claims. (Cl. 259—41)

This invention relates to improvements in mechanisms for mixing, feeding and delivering materials, and more specifically to the mechanism of this type adapted for use on the farm for delivering feeds, grains and roughage from a wagon or forage box.

My invention is intended for use at the end of a wagon or forage box, or truck body, of the type which is provided with means such as a bottom conveyor mechanism, by which material is delivered toward the end at which the mixer-feeder mechanism is mounted. This conveyor is power operated and includes traveling slats which act to move the materials out to the open end of the box, and my invention has as its primary object the provision of a mechanism which will deliver the material, so acted upon by the bottom conveyor, out to one side and onto a vertically swingable and adjustable elevator conveyor. The mechanism further includes rotary mixing elements which act to mix and blend the materials from the wagon box prior to their delivery from the elevator conveyor. As one example for the use of such a mechanism, it is at present the custom to feed grains and roughage to stock which are being built up for beef purposes, and the mechanism of my invention will thoroughly blend these feed materials and deliver them to the feed box or bins much more rapidly than is possible in any other manner of operation.

Another object of my invention is to provide a mixing and feeding mechanism of this nature which is reversable in order to deliver the material out to either side of the box and which includes rotary mixing and beating elements, so arranged as to very thoroughly blend the feed material together where they are of a different nature, such as a combination of grain and roughage, and which elements may also be arranged to blend and fluff roughage, such as green feed materials where they are being fed without grain.

Still another object of my invention is to provide various novel features of construction and operation, all of which contribute to the effective operation of the mechanism, as will be pointed out in more detail hereinafter.

These and other more detailed and specific objects will be disclosed in the course of the following specification, reference being had to the accompanying drawings, in which—

Fig. 3 is an enlarged vertical cross sectional view along the line 3—3 in Fig. 2.

Fig. 4 is an enlarged vertical and longitudinal sectional view along the line 4—4 in Fig. 1.

Fig. 5 is a further enlarged detailed cross sectional view through the adjacent ends of the conveyors forming part of my mechanism, with the view taken along the line 5—5 in Fig. 6.

Fig. 6 is a detail sectional view taken lengthwise of the conveyors shown in Fig. 5.

Fig. 7 is an enlarged exploded perspective view of the pivot connection between the elevator conveyor and the cross conveyor forming part of my invention.

Figure 1:
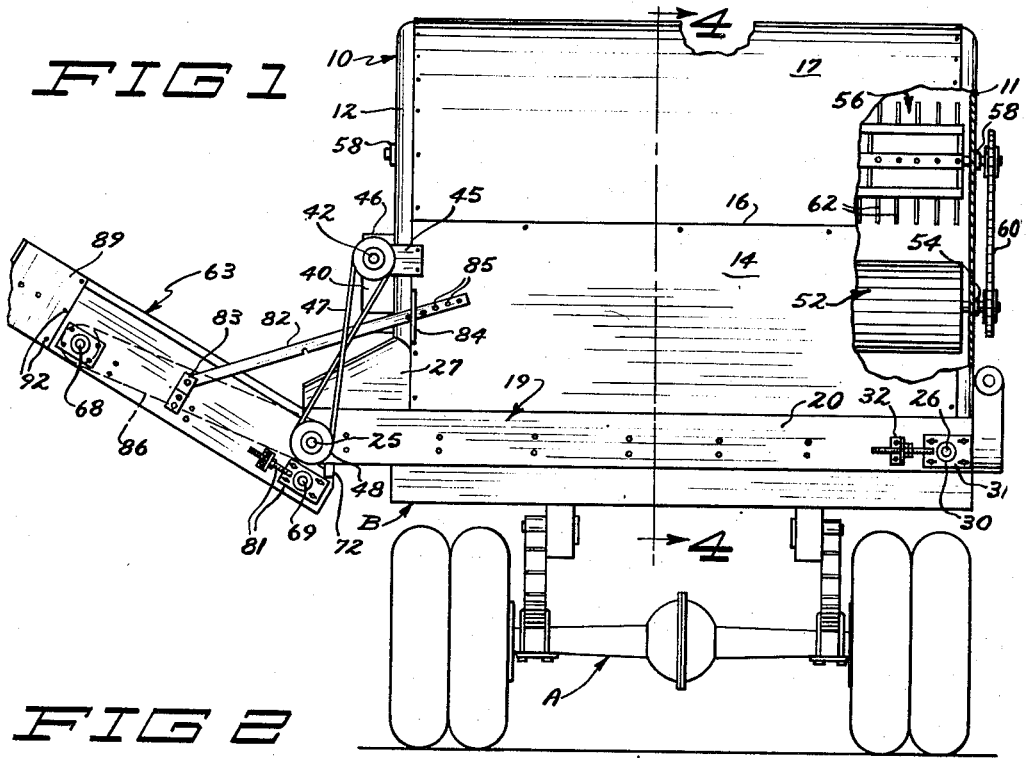
Fig. 1 is a rear end view of my mixing and feeding mechanism as attached to a wagon or forage box carried upon a motor truck, with a portion of the housing broken away to disclose interior details of construction.

Referring now more particularly and by reference characters to the drawing, I have shown my mixer-feeder mechanism as applied to the rear end of a motor truck, designated generally at A, upon which is mounted a forage or wagon box, designated generally at B. The latter comprises a bottom C over which there operates, from front to rear, a conveyor made up of side chains D, connected by a series of cross slats E, and with said chains operating over sprockets at the front and rear of the box, one of which appears at F in Fig. 4. This conveyor is power operated by a suitable connection (not shown) to the truck engine or to the power take-off shaft of a tractor if the box is mounted on a trailer-type of undercarriage. The conveyor, of course, extends the full width between the sides G of the box and will deliver materials contained in the box toward the open rear end thereof, where the material enters a housing 10 forming the main frame of my mixing and feeding mechanism. This housing 10 is made up from sheet material, having the opposed sides 11 and 12 secured at forward edges in any suitable manner, as by means of the registering brackets 13, to the rear edges of the sides G in order to hold the mechanism in place upon the box. The housing is open at its forward side facing the box, but is closed at the rear end 14 and open at its bottom 15, all as clearly shown in Fig. 4. Preferably the housing is made of two superimposed sections, separable along the horizontal line 16, and at its upper extremity the rear end curves forwardly in the form of a hood 17. It will be noted that the delivery end of the wagon box conveyor enters into the forward lower edge of the housing 10 and that the housing itself has its open lower end or bottom 15 located below this conveyor in order to receive material therefrom. Also as seen in Fig. 4, flexible rubber strips 18 are mounted at the delivery end of the wagon box conveyor so that the slats E must pass between these elements in order to clean the slats of any collected material.

Located crosswise below the housing 10, and constituting the bottom thereof, is a cross conveyor, indicated generally at 19, having spaced parallel sides 20 and 21 between which there operates an endless flexible apron conveyor 22. This conveyor runs at its opposite ends over elongated rollers or sprockets 23 and 24, carried by shafts 25 and 26 journaled through the conveyor sides 20—21, and as will be seen in Fig. 3 this conveyor structure is considerably longer than the width of the housing 10, so that its delivery end projects beyond the adjacent side of the housing, in order to deliver material therefrom out between the angularly shaped deflectors 27 suitably fastened to the conveyor and housing. This cross conveyor is slidably, detachably associated with the housing 10 by forming the contiguous edges of the housing bottom 15 and the conveyor sides 20—21 with interfitting lock seams 28, so that the conveyor may be moved endwise and installed or detached with its delivery end at either side of the housing. When properly mounted the conveyor is locked in place by suitable bolts 29 inserted through said lock seams 28. The pulley 24 for the cross conveyor 19 has its shaft 26 journaled in bearings 30 carried in slidably mounted adjusting plates 31, having a well known type of adjusting means 32 by which the conveyor apron may be kept in a taut condition. At the delivery end the shaft 25 of the pulley 23 is, as seen in Fig. 7, journaled at its opposite ends in bearings 33, held in place by bearing plates 34 attached to the outer faces of the conveyor sides. The bearing plates 34 are circular and secured over each is a larger circular retaining plate 35, with both of the plates provided with mating openings 36 by which these assemblies may be held by bolts (not shown). The purpose of this precise bearing structure will presently appear.

Figure 2:
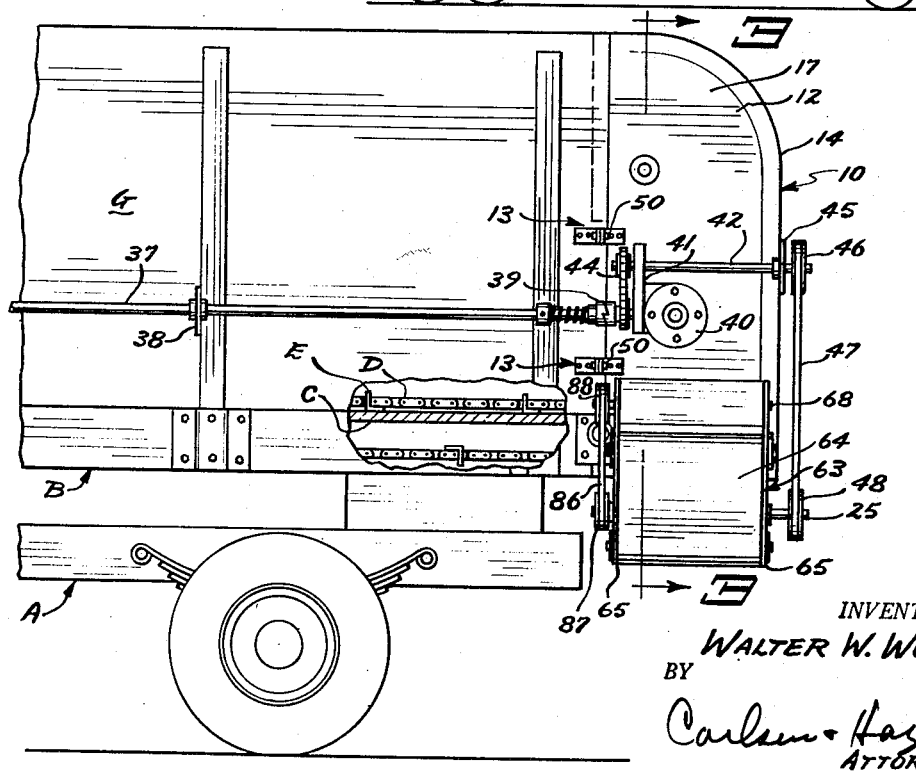
Fig. 2 is a side view of the mixing and feeding mechanism and adjacent rear end of the truck and box, with a portion of the latter broken away to show the conveyor which operates over its bottom to deliver material rearwardly to the mixer and feeder.

The cross conveyor 19 is operated from the truck engine (or tractor power take-off) by means of a drive shaft 37, journaled back along one side of the box B through bearings, one of which appears at 38 in Fig. 2. At its rear end the shaft 37 is connected through a spring loaded clutch 39 to the input shaft of a geared drive unit 40 secured upon the adjacent end 12 of the housing 10. This unit 40 includes a suitable, vertical bearing structure 41 wherein is journaled a countershaft 42 connected to the input shaft of the speed reducer unit by means of sprockets 43 and a sprocket chain 44. The countershaft 42 is journaled rearwardly through a bearing 45 on the back of the housing 10, and rearwardly of that bearing the shaft carries a pulley 46 over which operates a crossed belt 47 leading to a drive pulley 48 upon the shaft 25 at the delivery end of the conveyor. The spring loaded clutch 39 permits this drive connection to be readily disconnected and has another function to be later described. The connections 13 by which the mechanism is mounted upon the sides G of the box are also quickly detachable and as seen in Fig. 3 such connections or brackets have downwardly opening notches 49 by which they may be secured to the bolts 50, permitting the housing to be lifted clear when the bolts are slightly loosened. Referring to Fig. 4 it will be noted that the forward side 21 of the cross conveyor 19 is preferably attached not directly to the housing 10 itself, but to a hanger strip 51 bolted across the rear end of the bottom of the box and having the aforesaid lock seam 28 for slidably mounting the cross conveyor. It is necessary, therefore, in disconnecting the mechanism from the box either to detach this hanger strip 51 from the box or to slide the cross conveyor clear before the housing is removed.

The geared drive unit 40 drives and rotatably supports one end of a beater or rotary mixing element, which is designated generally at 52, and is located in the lower portion of the housing 10 crosswise of the wagon box. At its opposite end this element 52 has its axially extending supporting shaft 53 journaled in a suitable bearing 54 in the housing end 11, and as here shown the element 52 comprises a cylindrical and longitudinally angularly serrated or fluted drum 55. The diameter and location of this drum is such that it closely approaches the delivery end of the wagon box conveyor and is located immediately above and to the rear of this end of the conveyor. Also forming part of the mixing and feeding mechanism and located in superimposed relation to the element 52 is a second beater or rotary mixing element, designated generally at 56, having an axially extending shaft 57 by which it is supported for rotation in the upper part of the housing 10 parallel to, but some distance forwardly of, the element 52. The shaft 57 at its opposite ends is journaled through bearings 58 in the housing ends 11—12 and at the end of the housing opposite the drive unit 40 the shafts 53 and 57 project from the housing for mounting sprockets 59, which are connected by a sprocket chain 60 in order to rotate both elements 52—56 in the same direction. The beater element 56 includes a series of circumferentially spaced channel-shaped bars 61 from which there radially projects a plurality of beater teeth or pegs 62, as clearly shown in Figs. 3 and 4. One or more additional beaters may also be used, of course, one above the other.

Also forming part of the mechanism of my invention is an elevator conveyor, designated generally at 63, demountably positioned on the delivery end of the cross conveyor 19 and having a conveyor apron 64 to receive, elevate and discharge material received from the cross conveyor. The conveyor 63 also has parallel sides, both here shown at 65, between which are journaled pulleys 66 and 67, carried upon shafts 68 and 69 journaled through the sides. It is, of course, necessary that the receiving end of the apron 64 be located beneath the delivery end of the cross conveyor and for so mounting the elevator conveyor the sides 65 project a considerable distance above apron 64, and at their ends nearest the cross conveyor the sides are provided with large notches 70 having curved, closed ends 71, as best seen in Fig. 7. The width of these notches 70 is such that these ends of the sides 65 may be slipped over the bearing plates 34 until the curved, closed ends 71 of the notches come to bear pivotally on the plates, in order to permit up and down swinging movements of the elevator. The retainer plates 35, being of larger diameter, prevent any possible lateral displacement of the elevator, and once it is mounted by these notches, as described, it is locked against outward or endwise displacement by means of lock bars 72, which are bolted at 73 across the open ends of the notches 70 and which carry arcuately formed lock plates 74 to engage the bearing plates 34 in opposition to the closed ends of the notches. This mounting is extremely simple and permits the elevator 63 to swing up and down at its outer delivery end, about the axis of the pulley 23 at the delivery end of the cross conveyor in order to maintain the conveyor aprons 22 and 64 in proper relation. The upper, inner corners of the sides 65, where the lock bars 72 are mounted, are beveled off, as designated at 75. The escape of material through the space between the adjacent ends of the aprons 22 and 64 is prevented by means of a flexible seal strip 76 which, as best shown in Fig. 6, is secured to a suitable cross member 77 between the sides 65, so that its upper and lower edges operate in wiping relation with the respective aprons. The lateral escape of material from the sides of the aprons 22 and 64 is similarly prevented by longitudinal flexible seal strips 78 and 79, respectively, the upper edges of which are fastened by rivets or other means, designated collectively at 80, to the adjacent sides of the conveyors. The lower edges of these flexible strips 78—79 are thus arranged in wiping relation with the upper material carrying flights of the conveyor aprons, as best shown in Fig. 4.

The shafts 68—69 for the elevator conveyor 63 are journaled in and through suitable bearings secured to the sides 65 and at the receiving end of the conveyor these bearings are again carried in apron tightening means 81 to maintain the apron in a proper operating condition, as previously described.

The elevator 63 is raised or lowered and held in adjusted position by means of a support link 82, pivoted at 83 at an outer end to one side of the conveyor and extending angularly and inwardly through a suitable bracket 84 at the adjacent rear corner of the housing 10. The link 82 has a plurality of openings 85 for the reception of a bolt or key to support the elevator in adjusted angular positions, and when not in use the elevator may be folded upward and inward, as will be understood. The elevator apron 64 is operated by a belt 86 placed over a pulley 87 at one end of the shaft 68 and a similar pulley 88 on the cross conveyor shaft 23. This is, of course, the shaft operated by the belt 47 and the arrangement is such that both aprons 22 and 64 will be operated or traveled in the same direction. The open delivery end of the elevator conveyor 63 is provided with flexible flap extensions 89, which are joined by an arcuate, adjustable deflector hood 90 pivoted at 91. The hood 90 prevents material from being cast out too far from the side of the truck and may be adjusted to direct the material downward at a suitable angle for dropping the material into the feed bunkers or bins along which the truck passes. The flexibility of the flaps 89, which are secured at 92 to the side 65, prevents damage which might otherwise be caused by the delivery end of the elevator striking obstructions, such as fence posts or the like, along the line of travel.

The cross conveyor sides 20—21 and elevator conveyor sides 65 are, as usual, cross connected by apron support plates designated at 93 and 94, respectively, for obvious purposes.

In the operation of the mechanism torque is transmitted to the various operating parts in such fashion that the mixer and beater elements 52 and 16 both rotate in a clockwise direction, as viewed in Fig. 4, or in opposition to the flow of material from the box B into the housing 10. Assuming that grain and roughage is being fed, these materials will ordinarily be loaded into the box B in alternating layers and as this body of material is moved rearwardly by the wagon box conveyor the lower element 52, operating against the material with a kind of "overshot" action, allows a part to pass immediately onto the cross conveyor 19 while a part is brought up into position for opposite movement by the upper element 16. There results then an agitation and blending of the material with the result that the end product delivered by the cross conveyor and off the elevator conveyor 63, is very thoroughly commingled, and since the operation is a continuous one it will be readily understood that it may be carried out very rapidly. Where green feed or roughage alone is being fed, I prefer to use a second peg type of element 56 instead of the fluted drum 55, so that these cooperating and rotating beaters will very thoroughly fluff this material and prevents the uneven flow, or possible jamming of the machine, which might otherwise be caused by the tendency of this kind of material to collect in hardened chunks or bunches and bridge over as it is delivered from the box. I have herein shown and described the mechanism as mounted at the rear of the box B and as delivering from the lefthand side thereof, but the cross and elevator conveyors may be reversed with reference to the housing 10 to deliver from the righthand side, merely by slipping the cross conveyor endwise off the housing and replacing it from the opposite side. A longer belt will then be substituted for the belt 47 to properly transmit the drive to the two conveyors. Also the entire mechanism may be mounted at the front of the box B, in order to deliver material moved forwardly in the box B (the wagon box conveyor being, of course, reversible as to travel), and in this forwardly located position again the delivery may be made to either side. The spring loaded clutch 39 is desirable in order to allow the parts operated off the shaft 37 to run down their inertia or momentum when the power is disengaged in order not to bring too much strain on the various drive components, as will be understood.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For use in connection with a wagon box having a power driven means for moving material toward an open end of the box, a mixer and feeder mechanism of the character described, comprising a housing having side walls and an outer end wall removably mounted over the open end of the box and to receive material therefrom, a cross conveyor at the bottom of said housing and supported thereby for laterally delivering material from the box, superimposed beater elements journaled in the side walls of said housing for mixing and fluffing material received from the box and delivering the mixed material to the cross conveyor, and means for operating the cross conveyor and beater elements.

2. For use in connection with a wagon box having a power driven means for moving material toward an open end of the box, a mixer and feeder mechanism of the character described, comprising a housing having side walls and an outer end wall removably mounted over the open end of the box and to receive material, a cross conveyor at the bottom of said housing and supported thereby for laterally delivering material from the box, superimposed beater elements journaled in the side walls of said housing for mixing and fluffing material received from the box and delivering the mixed material to the cross conveyor, and means for operating the cross conveyor and beater elements, the lower beater element being located closely adjacent the end of the wagon box and the upper beater element being spaced above the lower and offset with respect thereto toward the box.

3. For use in connection with a wagon box having power driven means for moving material toward an open end of the box, a mixer and feeder mechanism of the character described, comprising a housing having side walls and an outer end wall removably mounted over the open end of the box and to receive material from the box, a cross conveyor at the bottom of said housing and supported thereby for laterally delivering material from the box, superimposed beater elements journaled in the side walls of said housing for mixing and fluffing material received from the box and delivering the mixed material to the cross conveyor, an elevator conveyor and means mounting the same at the end of the cross conveyor to be bodily removable with the housing and to elevate and discharge material received therefrom, and means for operating the cross and elevator conveyors and the beater elements.

4. For use in connection with a wagon box having a power driven endless conveyor for moving material toward an open end of the box, a mixer and feeder mechanism of the character described, comprising a housing having side walls and an outer end wall removably mounted over the open end of the box and to receive material from the conveyor therein, a cross conveyor at the bottom of said housing and supported thereby for laterally delivering material from the box, superimposed beater elements journaled in the side walls of said housing for mixing and fluffing material received from the box and delivering the mixed material to the cross conveyor, an elevator conveyor and means mounting the same at the end of the cross conveyor to be bodily removable therewith and to elevate and discharge material received therefrom, means for operating the cross and elevator conveyors and the beater elements, and the lower beater element being located crosswise at the delivery end of the wagon box conveyor to constitute an end gate for the open end of the wagon box and the upper beater element being located above said delivery end and in spaced relation above the lower beater element.

5. A material mixing and feeding mechanism of the character described for mounting on a wagon box having a power driven bottom conveyor, comprising in combination, a housing having an open front end, and closed sides and a closed rear end for receiving material from the box, a cross conveyor at the bottom of the housing and supported thereby and located crosswise beneath the delivery end of said bottom conveyor, a lower rotary element journaled in the side walls of the housing above the delivery end of the bottom conveyor constituting an end gate for the wagon box and means for rotating this rotary element in a direction for moving material upwardly from the box and delivering the material with an overshot action to the cross conveyor, and a second rotary element journaled in the side walls of the housing above the lower element and means for rotating the upper element in the same direction as the lower for mixing the material.

6. A material mixing and feeding mechanism of the character described for mounting on a wagon box having an open end and a power driven bottom conveyor, comprising in combination, a housing removably mounted over the open end of the box having an open front end, and closed sides and a closed rear end for receiving material from the box, a cross conveyor at the bottom of the housing and supported thereby and located crosswise beneath the delivery end of said bottom conveyor, a lower rotary element journaled in the side walls of the housing above the delivery end of the bottom conveyor constituting an end gate for the wagon box and means for rotating this rotary element in a direction for moving material upwardly from the box and delivering the material with an overshot action to the cross conveyor, a second rotary element journaled in the side walls of the housing above the lower element and means for rotating the upper element in the same direction as the lower element for mixing the material, an elevator conveyor at the delivery end of the cross conveyor bodily movable with the housing and cross conveyor for delivering the mixed material laterally from the box, and means for operating the cross and elevator conveyors.

7. For use in connection with a wagon box having a power driven endless conveyor for moving material toward an open end of the box, a mixer and feeder mechanism of the character described, comprising a housing removably mounted over the open end of the box and to receive material from the conveyor therein, a cross conveyor at the bottom of said housing for laterally delivering material from the box, superimposed beater elements journaled in the housing for mixing and fluffing material received from the box and delivering the mixed material to the cross conveyor, and means for operating the cross conveyor and beater elements, the lower beater element comprising a longitudinally fluted cylindrical drum also constituting an end gate for the open end of the wagon box and the upper beater element having radially projecting material engaging and mixing pegs.

References Cited in the file of this patent

UNITED STATES PATENTS

| Number | Name | Date |
| --- | --- | --- |
| 712,581 | Oppenheim et al. | Nov. 4, 1902 |
| 779,714 | Kemp | Jan. 10, 1905 |
| 1,093,928 | Hageman | Apr. 21, 1914 |
| 1,312,304 | Burgess | Aug. 5, 1919 |
| 1,422,002 | Shaw | July 4, 1922 |
| 2,083,864 | Puckett | June 15, 1937 |
| 2,503,129 | Pautz | Apr. 4, 1950 |